United States Patent
Rao et al.

(10) Patent No.: US 12,541,223 B1
(45) Date of Patent: Feb. 3, 2026

(54) CLOCK GATING

(71) Applicant: Cadence Design Systems, Inc., San Jose, CA (US)

(72) Inventors: Kandregula Uma Suri Appa Rao, Munagapaka (IN); Udatha Sambasiva Rao, Andhra Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 202 days.

(21) Appl. No.: 18/598,424

(22) Filed: Mar. 7, 2024

Related U.S. Application Data

(60) Provisional application No. 63/452,827, filed on Mar. 17, 2023.

(51) Int. Cl.
*G06F 1/12* (2006.01)
*G06F 1/3237* (2019.01)

(52) U.S. Cl.
CPC .............. *G06F 1/12* (2013.01); *G06F 1/3237* (2013.01)

(58) Field of Classification Search
CPC ..................................... G06F 1/10; G06F 1/12
See application file for complete search history.

(56) References Cited

U.S. PATENT DOCUMENTS

| | | | |
|---|---|---|---|
| 6,442,700 B1* | 8/2002 | Cooper ................... | G06F 1/206 713/323 |
| 7,564,283 B1* | 7/2009 | Logue ................... | H03L 7/0816 327/158 |
| 2002/0091958 A1* | 7/2002 | Schoenfeld ............... | G06F 1/10 713/401 |
| 2017/0155497 A1* | 6/2017 | Barrenscheen ....... | G06F 1/3237 |
| 2018/0307264 A1* | 10/2018 | Maciorowski .......... | G06F 30/34 |
| 2024/0193116 A1* | 6/2024 | Gorni .................. | G06F 13/4031 |

* cited by examiner

*Primary Examiner* — Phil K Nguyen
(74) *Attorney, Agent, or Firm* — Mark H. Whittenberger, Esq.; Holland & Knight LLP

(57) ABSTRACT

During a low power mode, a fast clock may not be provided to serial/parallel conversion circuitry. An asynchronous gating signal that controls the gating of the fast clock may be synchronized to a slow clock and the fast clock. The frequency of the fast clock may be an integer multiple of the slow clock, such that gating the fast clock based on the fast-slow clock synchronized gating signal results in the gating of the fast clock lasting for a duration that may be an integer multiple of the serialization factor multiplied by the conversion circuitry FIFO buffer depth. This maintains the relationship between the FIFO buffer's read and write pointers and associated clocking circuitry during the clock shutoff period. By maintaining these relationships during the clock shutoff period, the serial/parallel conversion circuitry may enter and exit the low power mode without requiring retraining as data path latencies remain unchanged.

20 Claims, 9 Drawing Sheets

GENERATE A FAST CLOCK SIGNAL HAVING A FAST CLOCK FREQUENCY AND A SLOW CLOCK SIGNAL HAVING A SLOW CLOCK FREQUENCY
502

MAINTAIN A WRITE POINTER THAT DETERMINES RESPECTIVE ENTRIES OF A FIFO BUFFER THAT RECEIVE EACH PARALLEL DATA WORD WRITTEN TO THE FIFO BUFFER, THE FIFO BUFFER HAVING A FIRST NUMBER OF ENTRIES
504

MAINTAIN A READ POINTER THAT DETERMINES RESPECTIVE ENTRIES OF THE FIFO BUFFER THAT PROVIDE EACH PARALLEL DATA WORD READ FROM THE FIFO BUFFER, CHANGES TO THE READ POINTER BEING BASED ON A DIVIDED FAST CLOCK SIGNAL, THE DIVIDED FAST CLOCK SIGNAL TO HAVE A DIVIDED FAST CLOCK FREQUENCY
506

RECEIVE, BY SERIALIZATION CIRCUITRY, DATA WORDS READ FROM THE FIFO BUFFER, THE SERIALIZATION CIRCUITRY SERIALIZING THE DATA WORDS READ FROM THE FIFO BUFFER BY A SERIALIZATION FACTOR, THE SERIALIZATION CIRCUITRY OUTPUTTING SERIALIZED DATA WORDS BASED ON THE FAST CLOCK SIGNAL, THE DIVIDED FAST CLOCK FREQUENCY TO BE THE FAST CLOCK FREQUENCY DIVIDED BY THE SERIALIZATION FACTOR, THE SLOW CLOCK FREQUENCY TO BE THE DIVIDED FAST CLOCK FREQUENCY FURTHER DIVIDED BY THE FIRST NUMBER OF ENTRIES
508

BASED ON AN ASYNCHRONOUS GATING CONTROL SIGNAL, GATING THE PROVISIONING OF THE FAST CLOCK SIGNAL TO THE MAINTAINING OF THE READ POINTER TO INTERVALS THAT ARE INTEGER MULTIPLES OF A SLOW CLOCK CYCLE TIME THEREBY MAINTAINING TIMING RELATIONSHIPS BETWEEN THE WRITE POINTER, READ POINTER, AND DIVIDED FAST CLOCK.
510

*FIG. 5*

```
┌─────────────────────────────────────────────────────────────┐
│   GENERATE A FAST CLOCK SIGNAL HAVING A FAST CLOCK          │
│ FREQUENCY AND A SLOW CLOCK SIGNAL HAVING A SLOW CLOCK       │
│                        FREQUENCY                            │
│                           702                               │
└─────────────────────────────────────────────────────────────┘
                              │
┌─────────────────────────────────────────────────────────────┐
│  MAINTAIN A READ POINTER THAT DETERMINES RESPECTIVE ENTRIES │
│   OF A FIFO BUFFER THAT PRODUCE DESERIALIZED PARALLEL DATA  │
│   WORDS READ FROM THE FIFO BUFFER, THE FIFO BUFFER HAVING A │
│                    FIRST NUMBER OF ENTRIES                  │
│                           704                               │
└─────────────────────────────────────────────────────────────┘
                              │
┌─────────────────────────────────────────────────────────────┐
│ MAINTAIN A WRITE POINTER THAT DETERMINES RESPECTIVE ENTRIES │
│  OF THE FIFO BUFFER THAT RECEIVE EACH DESERIALIZED PARALLEL │
│   DATA WORD WRITTEN TO THE FIFO BUFFER, CHANGES TO THE WRITE│
│   POINTER BEING BASED ON A DIVIDED FAST CLOCK SIGNAL, THE   │
│    DIVIDED FAST CLOCK SIGNAL TO HAVE A DIVIDED FAST CLOCK   │
│                        FREQUENCY                            │
│                           706                               │
└─────────────────────────────────────────────────────────────┘
                              │
┌─────────────────────────────────────────────────────────────┐
│    RECEIVE, BY DESERIALIZATION CIRCUITRY, SERIALIZED PARALLEL│
│  DATA WORDS, THE DESERIALIZATION CIRCUITRY DESERIALIZING THE│
│   RECEIVED SERIAL DATA WORDS BY A SERIALIZATION FACTOR, THE │
│    DESERIALIZATION CIRCUITRY DESERIALIZING BASED ON THE FAST│
│    CLOCK SIGNAL, THE DIVIDED FAST CLOCK FREQUENCY TO BE THE │
│   FAST CLOCK FREQUENCY DIVIDED BY THE SERIALIZATION FACTOR, │
│     THE SLOW CLOCK FREQUENCY TO BE THE DIVIDED FAST CLOCK   │
│         FREQUENCY DIVIDED BY THE FIRST NUMBER OF ENTRIES    │
│                           708                               │
└─────────────────────────────────────────────────────────────┘
                              │
┌─────────────────────────────────────────────────────────────┐
│  BASED ON AN ASYNCHRONOUS GATING CONTROL SIGNAL, GATING A   │
│   PROVISIONING OF THE FAST CLOCK SIGNAL TO THE MAINTAINING OF│
│   THE WRITE POINTER TO INTERVALS THAT ARE INTEGER MULTIPLES │
│     OF A SLOW CLOCK CYCLE TIME THEREBY MAINTAINING TIMING   │
│   RELATIONSHIPS BETWEEN THE WRITE POINTER, READ POINTER, AND│
│                      DIVIDED FAST CLOCK.                    │
│                           710                               │
└─────────────────────────────────────────────────────────────┘
```

*FIG. 7*

CLOCK GATING

RELATED APPLICATION(S)

This application claims the benefit of U.S. Provisional Application No. 63/452,827, filed 17 Mar. 2023, the entire contents of which are incorporated herein by reference in its entirety.

BACKGROUND

An integrated circuit (e.g., a memory controller, memory device, processor, etc.) may include input/output (I/O) transmitter/receiver interfaces (e.g., for a memory device or serial link interface) that may be placed in a low power mode. The low power mode(s) may involve shutting off (or gating) one or more clock signals.

SUMMARY

In an embodiment, an integrated circuit is provided. The integrated circuit may include clock gating circuitry to, based on a synchronized control signal, enable a first clock signal having a first frequency to be provided to serialization circuitry. The integrated circuit may further include a delay-locked loop element to receive the first clock signal and a second clock signal having a second frequency, the delay-locked loop element to generate a delayed version of the second clock signal with a first edge of the delayed version of the second clock signal that is substantially time-aligned with a first edge of the first clock signal, the first frequency to be a first integer multiple of the second frequency. The integrated circuit may also include gating control synchronization circuitry to, based on an asynchronous clock gating signal, the delayed version of the second clock signal, and the first clock signal, generate the synchronized control signal.

One or more of the following features may be included. The first edge of the first clock signal and the first edge of the delayed version of the second clock signal may both be rising edges. The first integer multiple may be equivalent to a serialization factor of the serialization circuitry multiplied by a first-in first-out depth of the serialization circuitry. The asynchronous clock gating signal may be asynchronous relative to the second clock signal. The gating control synchronization circuitry may further include first synchronization circuitry to synchronize the asynchronous clock gating signal to the second clock signal to generate a first synchronized clock gating signal. The gating control synchronization circuitry may further include second synchronization circuitry to synchronize the first synchronized clock gating signal to the first clock signal to generate the synchronized control signal. The first synchronized clock gating signal may be provided to the second synchronization circuitry between a second edge of the first clock signal and the first edge of the first clock signal.

In another embodiment, an integrated circuit is provided. The integrated circuit may include parallel data signals to serial data signals serialization circuitry comprising a first-in first-out buffer (FIFO) with a first depth of parallel data entries to receive parallel data to be serialized. The integrated circuit may further include serialization circuitry to receive the parallel data via the FIFO and output serialized data, based on the parallel data, which has been serialized by a first serialization factor. The serialization circuitry may output the serialized data timed by a fast clock signal, the serialization circuitry to receive the parallel data timed by a first divided fast clock signal, the first divided fast clock signal to have a first frequency that is a second frequency of the fast clock signal divided by the serialization factor. The integrated circuit may also include clock generation circuitry to generate the fast clock signal and a slow clock signal, the slow clock signal to have a third frequency that is the first frequency divided by the first depth. The integrated circuit may further include clock gating circuitry to, based on a synchronized control signal, enable a first clock signal having a first frequency to be provided to serialization circuitry. The integrated circuit may also include a delay-locked loop element to receive the fast clock signal and the slow clock signal, the delay-locked loop element to generate a delayed slow clock signal that is substantially time-aligned with an edge of the fast clock signal. The integrated circuit may further include gating control synchronization circuitry to, based on an asynchronous clock gating signal, the delayed slow clock signal, and the fast clock signal, generate a synchronized gating control signal. The integrated circuit may also include fast clock gating circuitry to, based on the synchronized gating control signal, selectively provide the fast clock signal to the parallel data signals to serial data signals serialization circuitry.

One or more of the following features may be included. The fast clock signal and the slow clock signal may be generated by phase-locked loop circuitry. The parallel data signals to serial data signals serialization circuitry may include write pointer circuitry that determines a first current FIFO entry receiving parallel data. The parallel data signals to serial data signals serialization circuitry may include read pointer circuitry that determines, based on the first divided fast clock signal, a second current FIFO entry providing parallel data to the serialization circuitry. The gating control synchronization circuitry may generate the synchronized gating control signal to maintain a timing relationship between the write pointer circuitry and the read pointer circuitry. The asynchronous clock gating signal may be asynchronous relative to the slow clock signal. The gating control synchronization circuitry may include first synchronization circuitry to synchronize the asynchronous clock gating signal to the slow clock signal to generate a first slow clock synchronized gating signal. The gating control synchronization circuitry may include second synchronization circuitry to synchronize the first slow clock synchronized gating signal to the first clock signal to generate the synchronized gating control signal.

In yet another embodiment, a method of operating an integrated circuit is provided. The method may include generating a fast clock signal having a fast clock frequency and a slow clock signal having a slow clock frequency. The method may further include maintaining a write pointer that determines respective entries of a FIFO buffer that receive each parallel data word written to the FIFO buffer, the FIFO buffer having a first number of entries. The method may also include maintaining a read pointer that determines respective entries of the FIFO buffer that provide each parallel data word read from the FIFO buffer, changes to the read pointer being based on a divided fast clock signal, the divided fast clock signal to have a divided fast clock frequency. The method may also include receiving, by serialization circuitry, data words read from the FIFO buffer, the serialization circuitry serializing the data words read from the FIFO buffer by a serialization factor, the serialization circuitry outputting serialized data words based on the fast clock signal, the divided fast clock frequency to be the fast clock frequency divided by the serialization factor, the slow clock frequency to be the divided fast clock frequency divided by the first number of entries. Based on an asynchronous gating control signal, the method may include gating a provisioning of the fast clock signal to the maintaining of the read pointer to intervals that are integer multiples of a slow clock cycle time thereby maintaining timing relationships between the write pointer, read pointer, and divided fast clock.

One or more of the following features may be included. The method may include synchronizing the slow clock signal to the fast clock signal to produce a synchronized slow clock signal. The method may also include synchronizing the asynchronous gating control signal to the synchronized slow clock signal to produce a slow clock synchronized gating control signal. The method may further include synchronizing a slow clock synchronized gating control signal to the fast clock signal to produce a fast and slow clock synchronized gating control signal. The method may also include using the fast and slow clock synchronized gating control signal to control the provisioning of the fast clock signal to the maintaining of the read pointer to intervals that are an integer multiple of the slow clock cycle time.

BRIEF DESCRIPTION OF THE DRAWINGS

FIG. 5 is a flowchart illustrating a method of operating a serializing integrated circuit.

FIG. 7 is a flowchart illustrating a method of gating a clock signal provided to deserializing circuitry.

DETAILED DESCRIPTION

An integrated circuit (e.g., a memory controller, memory device, processor, etc.), having input/output (I/O) transmitter/receiver interfaces (e.g., for a memory device or serial link interface) that may be placed in a low power mode. The low power mode(s) may involve shutting off (or gating) one or more clock signals provided to serial/parallel conversion circuitry or other circuitry of the interface. In an embodiment, a slow clock and a fast clock are generated. The fast clock may be used as a bit clock for the serial/parallel conversion circuitry. In an embodiment, an edge of the slow clock may be aligned to an edge of the fast clock so that signals using this aligned slow clock will have sufficient setup and hold time before a fast clock edge.

In some embodiments, during a low power mode, the fast clock will not be provided (i.e., gated off, shutoff, etc.) to the serial/parallel conversion circuitry. An asynchronous gating signal (a.k.a., clock enable) that controls the gating of the fast clock may be synchronized to the slow clock and the fast clock. Because the frequency of the fast clock may be an integer multiple of the slow clock, gating the fast clock based on the fast-slow clock synchronized gating signal results in the gating of the fast clock lasting for a duration that may be a integer multiple of the serialization factor multiplied by a serial/parallel conversion circuitry first-in first-out buffer (FIFO). In this manner, the relationship between the FIFO buffer write pointer and FIFO buffer read pointer (and associated clocking circuitry) may be maintained during the gating shutoff period. Because the relationship between the FIFO buffer write pointer and FIFO buffer read pointer (and associated clocking circuitry) may be maintained during the gating shutoff period, the serial/parallel conversion circuitry may enter and exit the low power mode without requiring retraining for changed latencies (e.g., between fast clock and write pointer).

Figure 1:
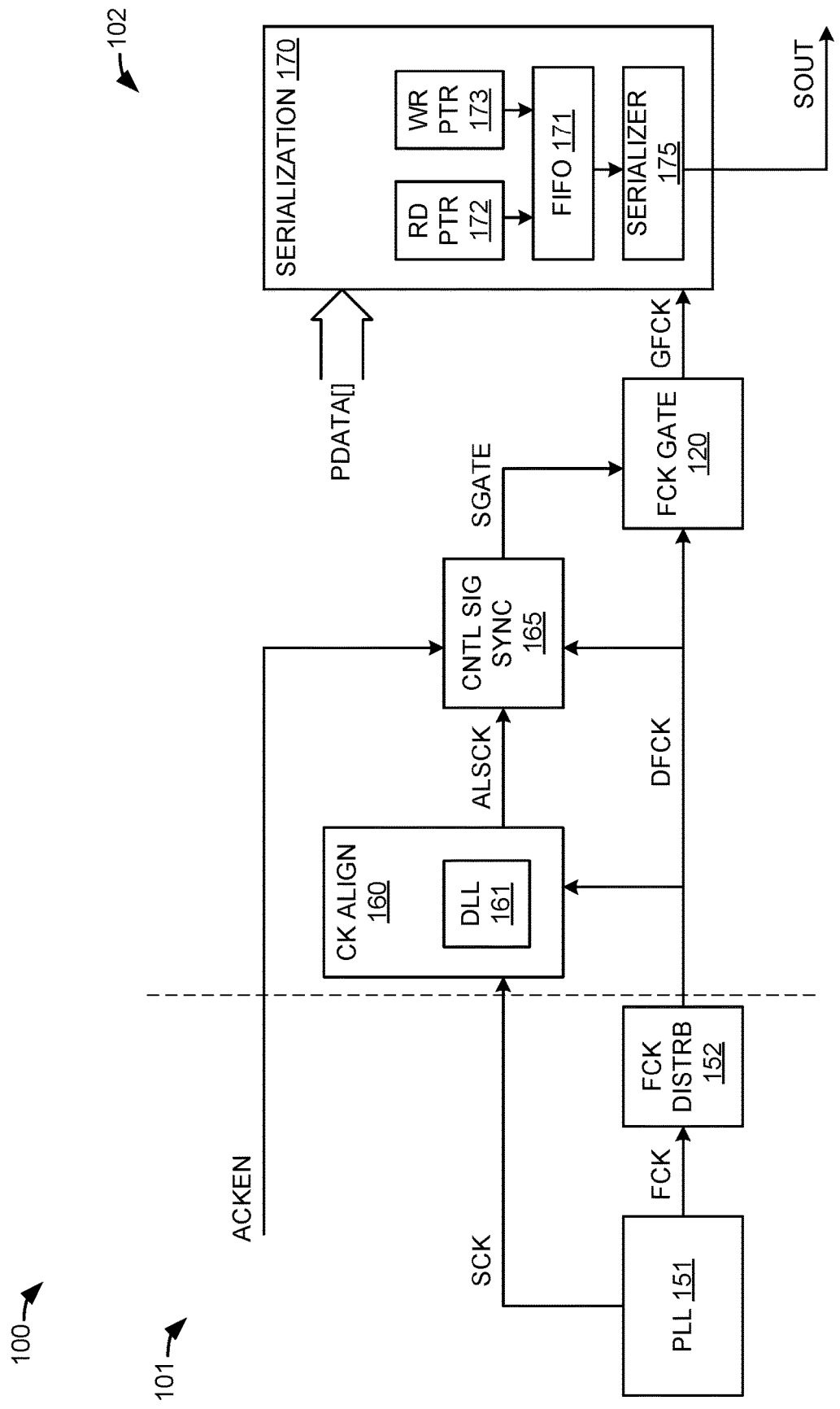
FIG. 1 is a block diagram illustrating an example integrated circuit serial data transmission system.

FIG. 1 is a block diagram illustrating an example integrated circuit serial data transmission system. In FIG. 1, integrated circuit 100 comprises phase locked loop (PLL) 151, fast clock distribution 152, clock alignment circuitry 160, control signal synchronization circuitry 165, fast clock gating circuitry 120, and serialization circuitry 170. Clock alignment circuitry 160 include delay locked loop (DLL) circuitry 161. Serialization circuitry 170 includes first-in first-out circuitry 171, read pointer circuitry 172, write pointer circuitry 173, and serializer circuitry 175.

In some embodiments, PLL 151 may be operatively coupled to clock alignment circuitry 160. PLL 151 may be operatively coupled to clock alignment circuitry 160 via fast clock distribution 152. In particular, a fast clock signal (FCK), generated by PLL 151, may be distributed (e.g., provided to this and/or other circuitry) by fast clock distribution thereby being at least delayed, skewed, etc. to become distributed fast clock signal DFCK. DFCK may be operatively coupled to clock alignment circuitry 160, control signal synchronization circuitry 165, and fast clock gating circuitry 120.

In some embodiments, PLL 151 may be operatively coupled to clock alignment circuitry 160. PLL 151 may be operatively coupled to clock alignment circuitry 160 to provide a slow clock signal (SCK) to clock alignment circuitry 160. In particular, at least a slow clock signal (SCK) produced by PLL 151 may be operatively coupled to clock alignment circuitry 160. In an embodiment, slow clock signal SCK cycles at the FCK frequency divided by the serialization factor of the serializer circuitry 175 and by the depth (i.e., number of entries) of first-in first-out circuitry 171. Put equivalently, the frequency that FCK cycles at may be an integer multiple of the SCK frequency multiplied by the serialization factor of the serializer circuitry 175 and further multiplied by the depth (i.e., number of entries) of first-in first-out circuitry 171. For example, for a serialization factor of 16, and a FIFO circuitry 171 depth of 4, SCK would cycle at the FCK frequency divided by 64—or equivalently, FCK would cycle at 64 times the SCK frequency.

In some embodiments, clock alignment circuitry 160 receives SCK and DFCK. Clock alignment circuitry 160 produces aligned slow clock signal ALSCK based on SCK and DFCK. Clock alignment circuitry 160 produces aligned slow clock signal ALSCK by generating a delayed version of SCK that aligns an edge of ALSCK with an edge of DFCK. In an embodiment, clock alignment circuitry 160 uses DLL circuitry 161 to delay SCK in order to align the edge of ALSCK with the edge of DFCK. For example, clock alignment circuitry 160 may use a feedback loop of DLL circuitry 161 to delay SCK by an amount of time that aligns a rising of ALSCK with a rising edge of DFCK.

In some embodiments, PLL 151 and all or portions of fast clock distribution 152 may be considered "global" circuitry 101. Clock alignment circuitry 160, control signal synchronization circuitry 165, fast clock gating circuitry 120, and serialization circuitry 170 may be considered "local" circuitry 102. In other words, one and/or a smaller number of global circuitry 101 instances may be providing signals (e.g., a slow clock signal—SCK, a fast clock signal—FCK, asynchronous clock enable signal—ACKEN, etc.) Clock alignment circuitry 160 provides aligned slow clock signal ALSCK to control signal synchronization circuitry 165.

In some embodiments, control signal synchronization circuitry also receives DFCK and asynchronous clock enable signal ACKEN. In an embodiment, ACKEN may be asynchronous with respect to one or more of DFCK and SCK. In other words, ACKEN may (or may not) be derived from, timed by, or timed from, one or more clocks generated by global circuitry 101 (e.g., SCK, FCK, etc.), but may not transition at fixed and known times relative to both DFCK and SCK once received by one or more elements of local circuitry 102.

In some embodiments, control signal synchronization circuitry 165 produces a synchronized clock gating signal SGATE. In an embodiment, SGATE may be synchronized to transition based on a transition (e.g., rising edge, falling edge) of aligned slow clock signal ALSCK that may be further timed by DFCK (e.g., falling edge of DFCK) such that SGATE will transition with sufficient setup and hold time in advance of an edge of DFCK (e.g., rising edge) to avoid glitches and/or shortened clock phases on the output of fast clock gating circuitry 120. Synchronized clock gating signal SGATE may be provided to fast clock gating circuitry 120.

In some embodiments, serialization circuitry 170 receives parallel data (e.g., PDATA[15:0]), serializes it by a serialization factor (e.g., 16), and outputs the serialized data of serial output signal SOUT. Serialization circuitry receives the parallel data and places it in an entry in FIFO circuitry 171. Serialization circuitry places each word of parallel data the entry in FIFO circuitry 171 pointed to by write pointer circuitry 173. To serialize data, serialization circuitry 170 reads the entry in FIFO circuitry 171 pointed to by read pointer circuitry 172 and provides it, in parallel form, to serializer circuitry 175. Serializer circuitry 175, in response to gated fast clock signal GFCK, outputs a serialized version of the word received from FIFO circuitry 171.

In some embodiments, fast clock gating circuitry 120, in response to synchronized clock gating signal SGATE, either passes DFCK or holds a constant output (e.g., logical "0"). The output of fast clock gating circuitry 120 may be a gated (i.e., either enabled or disabled) version GFCK of DFCK. In an embodiment, where the FCK frequency may be an integer multiple of the slow clock frequency, and the integer multiple may be equal to the serialization factor of serializer circuitry 175 multiplied by the depth of FIFO circuitry 171, because fast clock gating circuitry 120 may be responsive to synchronized clock gating signal SGATE, and SGATE may be synchronized to aligned slow clock ALSCK, SGATE will only transition such that the timing and value relationships between read pointer circuitry 172, write pointer circuitry 173, and serializer circuitry 175 are maintained across periods where DFCK may be prevented (gated) from being provided to serialization circuitry 170. By maintaining these relationships/values, until and as DFCK may be ungated, the data path latency of SOUT may be the same as it was before DFCK was gated and therefore retraining of the SOUT interface may not be required.

Figure 2:
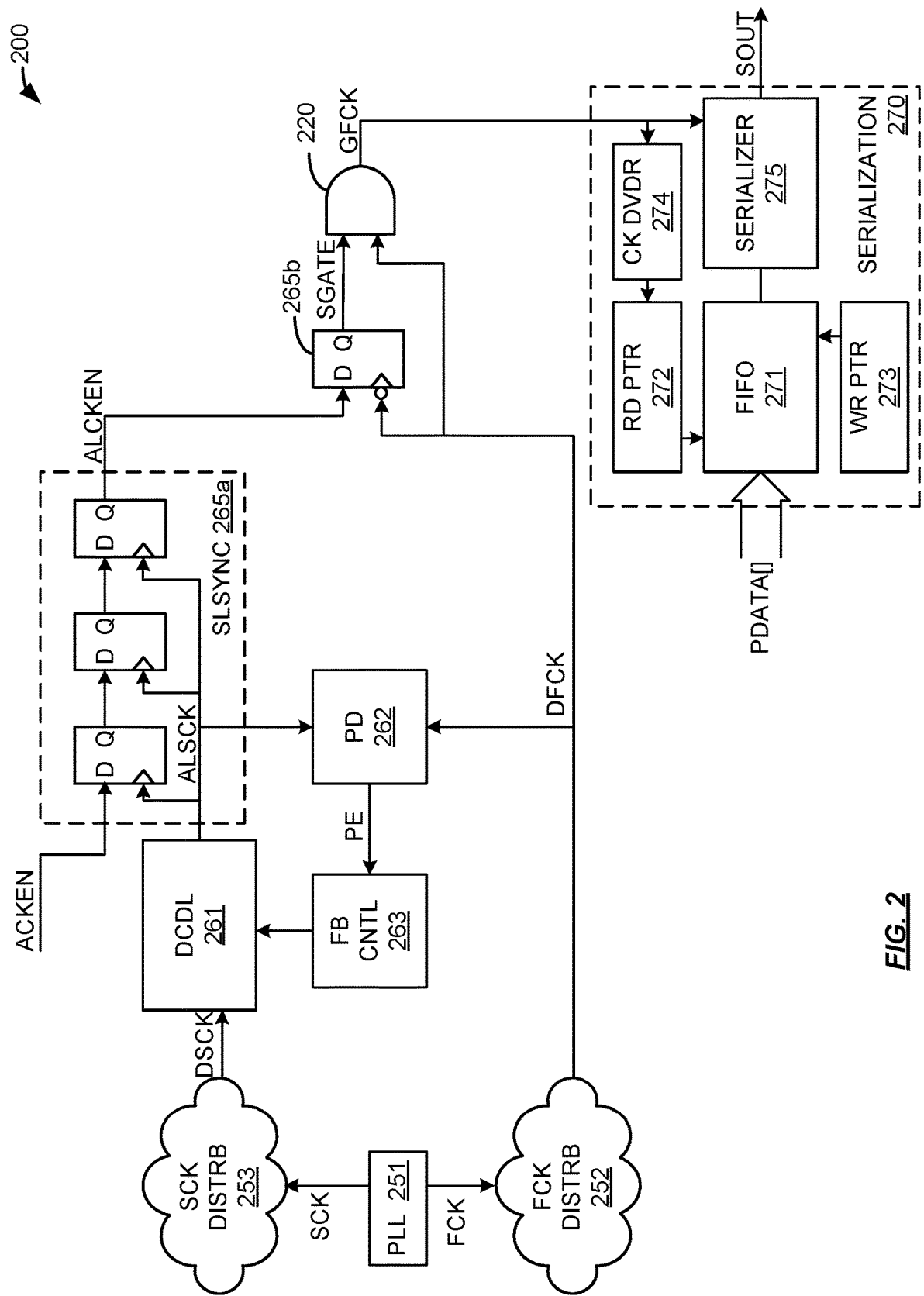
FIG. 2 is a block diagram illustrating an example gated serializer system.

FIG. 2 is a block diagram illustrating an example gated serializer system. In FIG. 2, integrated circuit 200 comprises phase locked loop (PLL) 251, fast clock distribution 252, slow clock distribution 253, digital controlled delay line (DCDL) circuitry 261, phase detector circuitry 262, feedback control circuitry 263, synchronize to slow clock circuitry 265a, synchronize to fast clock circuitry 265b, fast clock gating circuitry 220, and serialization circuitry 270. Serialization circuitry 270 includes first-in first-out buffer circuitry 271, read pointer circuitry 272, write pointer circuitry 273, clock divider circuitry 274, and serializer circuitry 275.

In some embodiments, serialization circuitry 270 may receive parallel data (e.g., PDATA[15:0]), serializes it by a serialization factor (e.g., 16), and outputs the serialized data of serial output signal SOUT. Serialization circuitry 270 receives the parallel data and places it in an entry in FIFO buffer circuitry 271. Serialization circuitry 270 places each word of parallel data the entry in FIFO buffer circuitry 271 pointed to by write pointer circuitry 273. To serialize data, serialization circuitry 270 reads the entry in FIFO buffer circuitry 271 pointed to by read pointer circuitry 272 and provides it, in parallel form, to serializer circuitry 275. The value of read pointer circuitry 272 is advanced based on a divided fast clock signal generated by clock divider circuitry 274. In an embodiment, clock divider circuitry 274 divides GFCK by the serialization factor of serializer circuitry 275 (e.g., 16). Serializer circuitry 275, in response to a gated fast clock signal GFCK, outputs a serialized version of the word received from FIFO buffer circuitry 271. In an embodiment, the parallel data words provided to serialization circuitry (and therefore stored in FIFO buffer circuitry 271) are 16 bits wide and clock divider circuitry 274 therefore divides GFCK by sixteen (16).

In some embodiments, PLL 251 may generate a slow clock (SCK) and a fast clock (FCK). In an embodiment, the frequencies of FCK and SCK are related by an integer multiple (e.g., 64). In particular, the frequency of FCK is the frequency of SCK multiplied by the depth of FIFO buffer circuitry 271 (e.g., 4) and multiplied by the serialization factor of serializer circuitry 275 (e.g., 16). SCK is operatively coupled to the signal input of delay circuitry 261 via slow clock distribution 253. In particular, slow clock signal (SCK), generated by PLL 251, is distributed (e.g., provided to this and/or other circuitry) by slow clock distribution 253 thereby being at least delayed, skewed, etc. to become distributed slow clock signal DSCK. DSCK is operatively coupled to delay circuitry 261.

In some embodiments, FCK may be operatively coupled to, via fast clock distribution 252, phase detector circuitry 262, synchronize to fast clock circuitry 265b, and fast clock gating circuitry 220. In particular, fast clock signal (FCK), generated by PLL 251, is distributed (e.g., provided to this and/or other circuitry) by fast clock distribution 252 thereby being at least delayed, skewed, etc. to become distributed fast clock signal DFCK. DFCK is operatively coupled to phase detector circuitry 262, synchronize to fast clock circuitry 265b, and fast clock gating circuitry 220.

In some embodiments, the output of phase detector circuitry 262 may be operatively coupled to feedback control circuitry 263. The inputs to phase detector circuitry 262 are distributed fast clock DFCK and the output of delay circuitry 261—aligned slow clock ALSCK. Feedback control circuitry 263 is operatively coupled to delay circuitry 261. Feedback control circuitry 263 is operatively coupled to delay circuitry 261 to control the delay applied to distributed slow clock signal DSCK that results in aligned slow clock signal ALSCK. Using the output of phase detector circuitry 262, feedback control circuitry adjusts the delay of delay circuitry 261 to align at least one edge of ALSCK with at least one edge of DFCK. Thus, it should be understood that phase detector circuitry 262, feedback control circuitry 263, and delay circuitry 261 form a delay locked loop circuit that produces aligned slow clock signal ALSCK based on DSCK and DFCK. Phase detector circuitry 262, feedback control circuitry 263, and delay circuitry 261 may cooperate to delay DSCK by an amount of time that, for example, aligns a rising of ALSCK with a rising edge of DFCK.

In some embodiments, PLL 251, all or portions of fast clock distribution 252, and all or portions of slow clock distribution 253 may be considered "global" circuitry. The remaining elements illustrated in FIG. 2 may be considered "local" circuitry. In other words, one and/or a smaller number of global circuitry instances may be providing signals (e.g., a slow clock signal—SCK, a fast clock signal—FCK, asynchronous clock enable signal—ACKEN, etc.)

In some embodiments, asynchronous clock enable signal ACKEN is asynchronous with respect to one or more of DFCK and DSCK. In other words, ACKEN may (or may not) be derived from, timed by, or timed from, one or more clocks generated by global circuitry (e.g., SCK, FCK, etc.), but may not transition at fixed and known times relative to both DFCK and DSCK once received by one or more elements of local circuitry.

In some embodiments, synchronize to slow clock circuitry 265a may include a plurality of "D" type flip-flops (e.g., three) in series being clocked by ALSCK. The first flip-flop in the series receives asynchronous clock enable signal ACKEN. The last flip-flop in the series produces slow clock aligned clock enable signal ALCKEN. Slow clock aligned clock enable signal is provided to synchronize to fast clock circuitry 265b. In an embodiment, synchronize to fast clock circuitry 265b comprises a "D" type flip-flop receiving ALCKEN at its data input and being clocked by DFCK.

In some embodiments, synchronize to fast clock circuitry 265b may produce a synchronized clock gating signal SGATE. SGATE is synchronized to transition based on a transition (e.g., rising edge, falling edge) of aligned slow clock signal ALSCK that is further timed by DFCK (e.g., falling edge of DFCK) such that SGATE will transition with sufficient setup and hold time in advance of an edge of DFCK (e.g., rising edge) to avoid glitches and/or shortened clock phases on the output of fast clock gating circuitry 220. Synchronized clock gating signal SGATE is provided to fast clock gating circuitry 220.

In some embodiments, fast clock gating circuitry 220, may in response to synchronized clock gating signal SGATE, either passes DFCK or holds a constant output (e.g., logical "0"). The output of fast clock gating circuitry 220 is a gated (i.e., either enabled or disabled) version GFCK of DFCK. In an embodiment, where the FCK frequency is an integer multiple of the slow clock frequency, and the integer multiple is equal to the serialization factor of serializer circuitry 275 multiplied by the depth of FIFO buffer circuitry 271, because fast clock gating circuitry 220 is responsive to synchronized clock gating signal SGATE, and SGATE is synchronized to aligned slow clock ALSCK, SGATE will only transition such that the timing and value relationships between read pointer circuitry 272, write pointer circuitry 273, clock divider circuitry 274, and serializer circuitry 275 are maintained across periods where DFCK is prevented (gated) from being provided to serialization circuitry 270. By maintaining these relationships/values, until and as DFCK is ungated, the data path latency of SOUT is the same as it was before DFCK was gated and therefore retraining of the SOUT interface is not required.

In some embodiments, integrated circuit 100 and integrated circuit 200 may be integrated circuit type devices, such as those commonly referred to as "chips". Integrated circuit 100 and integrated circuit 200 may be or comprise a memory controller. A memory controller manages the flow of data going to and from memory devices (e.g., a dynamic random-access memory (DRAM) or a non-volatile memory such as a flash memory device). Functionality of a memory controller may be included on a single die with a microprocessor or included as part of a more complex integrated circuit system as a block of a system on a chip (SOC). For example, a memory controller may be a northbridge chip, an application specific integrated circuit (ASIC) device, a load-reduction memory buffer, a graphics processor unit (GPU), a system-on-chip (SoC), a chiplet co-packaged with CPU and/or GPU cores, or an integrated circuit device that includes many circuit blocks such as ones selected from graphics cores, processor cores, and MPEG encoder/decoders, etc.

Figure 3:
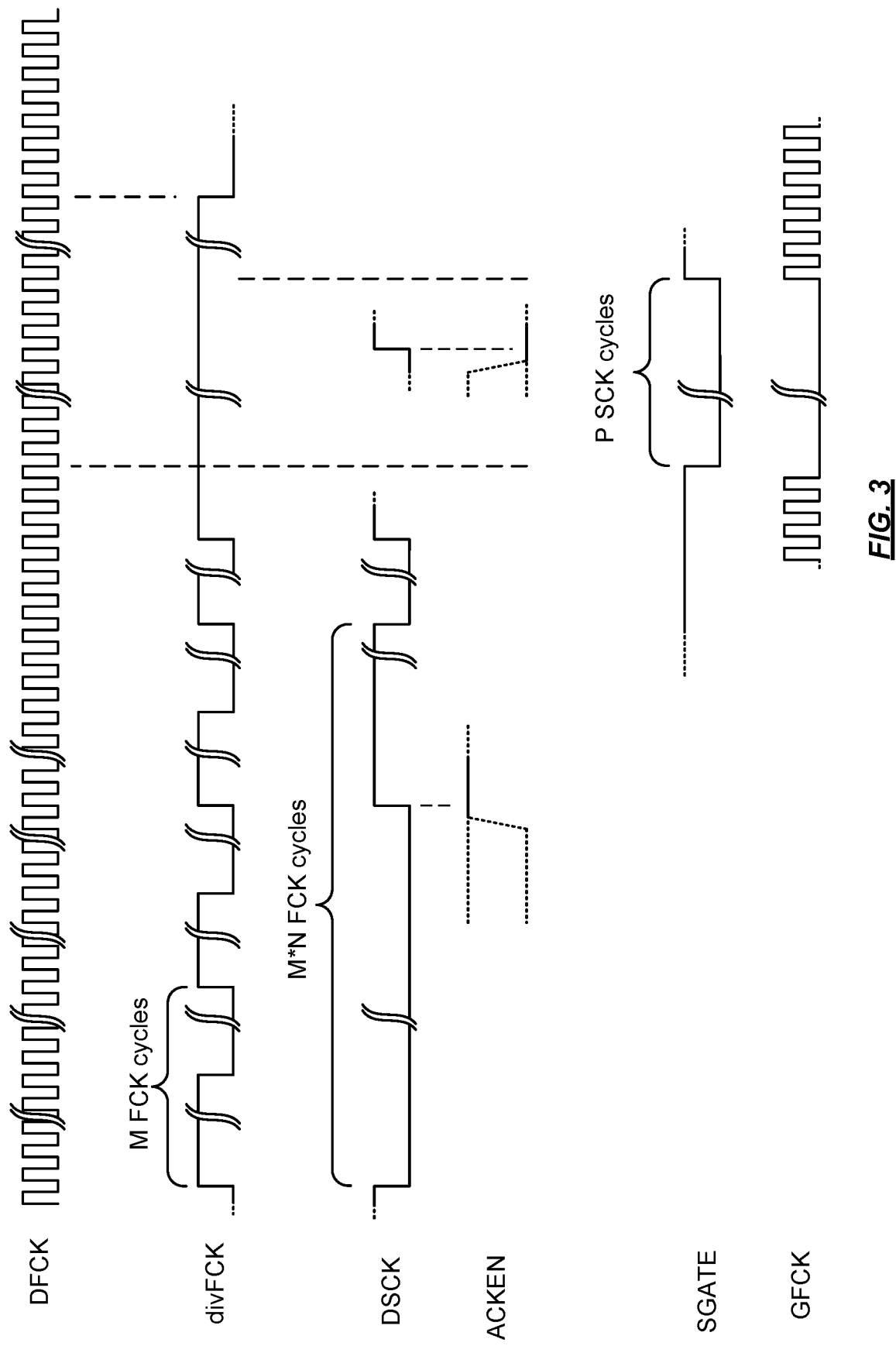
FIG. 3 is an example timing diagram illustrating clock gating of a serializer system.

FIG. 3 is an example timing diagram illustrating clock gating of a serializer system. In FIG. 3, distributed fast clock signal DFCK is illustrated (e.g., input to phase detector circuitry 262, synchronize to fast clock circuitry 265b, and input to fast clock gating circuitry 220). Divided fast clock divFCK is also illustrated (e.g., output signal of clock divider circuitry 274). Each cycle of divFCK is M DFCK (or FCK) cycles in length, where M is the serialization factor of the serializing system (e.g., 16). Distributed slow clock DSCK is illustrated as having a cycle time of M×N fast clock (DFCK or FCK) cycles, where N is the FIFO (e.g., FIFO circuitry 271) depth (e.g., 4).

Asynchronous clock enable signal ACKEN is illustrated signaling the gated clock signal GFCK should be disabled/deactivated (illustrated in FIG. 3 as active/enable clock when 'high', inactive/disable when 'low') during a rising edge of DSCK thereby triggering the gating of the serializing system. After being synchronized to slow clock DSCK and further synchronized to fast clock DFCK, synchronous gating signal SGATE is illustrated as transitioning to a clock off state for P number of slow clock SCK cycles. Similarly, gated fast clock signal GFCK is illustrated as not toggling while SGATE is in the clock off state. P is determined by the number of SCK cycles that ACKEN remains signaling that gated clock signal GFCK should be disabled/deactivated during each rising edge of DSCK.

In some embodiments, once ACKEN transitions to enabling GFCK, and is synchronized to DSCK and further synchronized to fast clock DFCK, synchronous gating signal SGATE is illustrated as transitioning to a clock on state. Similarly, gated fast clock signal GFCK is illustrated as returning toggling while SGATE is in the clock on state.

Figure 4:
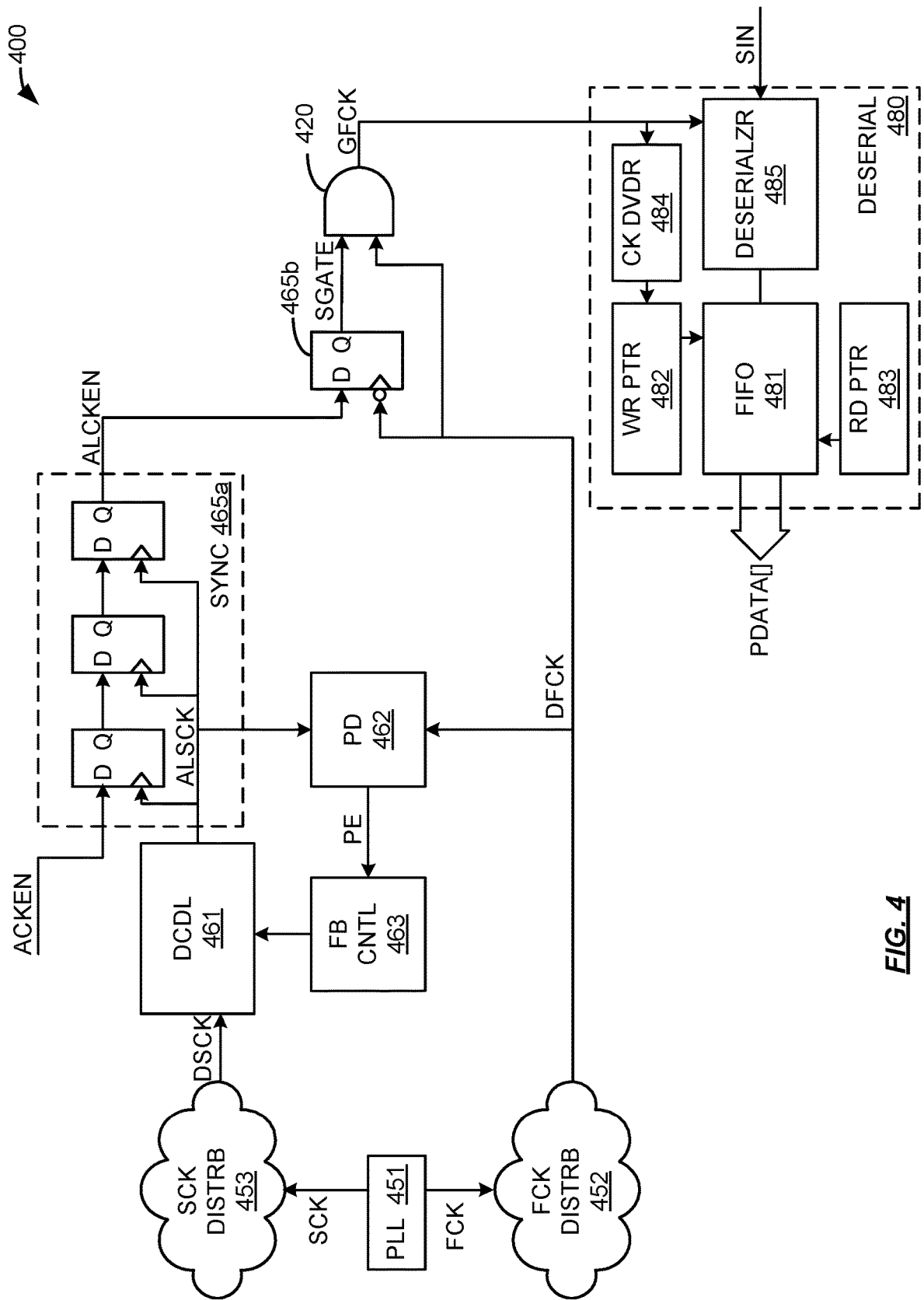
FIG. 4 is a block diagram illustrating an example gated deserializer system.

FIG. 4 is a block diagram illustrating an example gated deserializer system. In FIG. 4, integrated circuit 400 comprises phase locked loop (PLL) 451, fast clock distribution 452, slow clock distribution 453, digital controlled delay line (DCDL) circuitry 461, phase detector circuitry 462, feedback control circuitry 463, synchronize to slow clock circuitry 465a, synchronize to fast clock circuitry 465b, fast clock gating circuitry 420, and deserialization circuitry 480. Deserialization circuitry 480 includes first-in first-out buffer circuitry 481, write pointer circuitry 482, read pointer circuitry 483, clock divider circuitry 484, and deserializer circuitry 485.

In some embodiments, deserialization circuitry 480 receives serial data (e.g., via SIN), deserializes it by a deserialization factor (e.g., 16), and outputs parallel data (e.g., PDATA[15:0]. Deserialization circuitry 480 places each deserialized parallel data word in an entry in FIFO buffer circuitry 481. Deserialization circuitry 480 places each word of parallel data the entry in FIFO buffer circuitry 481 pointed to by write pointer circuitry 482. The value of write pointer circuitry 482 is advanced based on a divided fast clock signal generated by clock divider circuitry 484. In an embodiment, clock divider circuitry 484 divides GFCK by the serialization factor of deserializer circuitry 485 (e.g., 16).

In some embodiments, to output parallel data to other parts of integrated circuit 400 data, deserialization circuitry 480 reads the entry in FIFO buffer circuitry 481 pointed to by read pointer circuitry 483 and provides it parallel form. Deserializer circuitry 485, in response to a gated fast clock signal GFCK, samples SIN for the serial bits of the word being received. In an embodiment, the serialized data words being received (and therefore stored in FIFO buffer circuitry 481) are 16 bits long/wide and clock divider circuitry 484 therefore divides GFCK by sixteen (16).

In some embodiments, PLL 451 may generate a slow clock (SCK) and a fast clock (FCK). In an embodiment, the frequencies of FCK and SCK are related by an integer multiple (e.g., 64). In particular, the frequency of FCK is the frequency of SCK multiplied by the depth of FIFO buffer circuitry 481 (e.g., 4) and multiplied by the deserialization factor of deserializer circuitry 485 (e.g., 16). SCK is operatively coupled to the signal input of delay circuitry 461 via slow clock distribution 453. In particular, slow clock signal (SCK), generated by PLL 451, is distributed (e.g., provided to this and/or other circuitry) by slow clock distribution 453 thereby being at least delayed, skewed, etc. to become distributed slow clock signal DSCK. DSCK is operatively coupled to delay circuitry 461.

In some embodiments, FCK may be operatively coupled to, via fast clock distribution 452, phase detector circuitry 462, synchronize to fast clock circuitry 465*b*, and fast clock gating circuitry 420. In particular, fast clock signal (FCK), generated by PLL 451, is distributed (e.g., provided to this and/or other circuitry) by fast clock distribution 452 thereby being at least delayed, skewed, etc. to become distributed fast clock signal DFCK. DFCK is operatively coupled to phase detector circuitry 462, synchronize to fast clock circuitry 465*b*, and fast clock gating circuitry 420.

In some embodiments, the output of phase detector circuitry 462 may be operatively coupled to feedback control circuitry 463. The inputs to phase detector circuitry 462 are distributed fast clock DFCK and the output of delay circuitry 461—aligned slow clock ALSCK. Feedback control circuitry 463 is operatively coupled to delay circuitry 461. Feedback control circuitry 463 is operatively coupled to delay circuitry 461 to control the delay applied to distributed slow clock signal DSCK that results in aligned slow clock signal ALSCK. Using the output of phase detector circuitry 462, feedback control circuitry adjusts the delay of delay circuitry 461 to align at least one edge of ALSCK with at least one edge of DFCK. Thus, it should be understood that phase detector circuitry 462, feedback control circuitry 463, and delay circuitry 461 form a delay locked loop circuit that produces aligned slow clock signal ALSCK based on DSCK and DFCK. Phase detector circuitry 462, feedback control circuitry 463, and delay circuitry 461 may cooperate to delay DSCK by an amount of time that, for example, aligns a rising of ALSCK with a rising edge of DFCK.

In some embodiments, PLL 451, all or portions of fast clock distribution 452, and all or portions of slow clock distribution 453 may be considered "global" circuitry. The remaining elements illustrated in FIG. 4 may be considered "local" circuitry. In other words, one and/or a smaller number of global circuitry instances may be providing signals (e.g., a slow clock signal—SCK, a fast clock signal—FCK, asynchronous clock enable signal—ACKEN, etc.)

In some embodiments, asynchronous clock enable signal ACKEN may be asynchronous with respect to one or more of DFCK and DSCK. In other words, ACKEN may (or may not) be derived from, timed by, or timed from, one or more clocks generated by global circuitry (e.g., SCK, FCK, etc.), but may not transition at fixed and known times relative to both DFCK and DSCK once received by one or more elements of local circuitry.

In some embodiments, synchronize to slow clock circuitry 465*a* may include a plurality of "D" type flip-flops (e.g., three) in series being clocked by ALSCK. The first flip-flop in the series receives asynchronous clock enable signal ACKEN. The last flip-flop in the series produces slow clock aligned clock enable signal ALCKEN. Slow clock aligned clock enable signal is provided to synchronize to fast clock circuitry 465*b*. In an embodiment, synchronize to fast clock circuitry 465*b* comprises a "D" type flip-flop receiving ALCKEN at its data input and being clocked by DFCK.

In some embodiments, synchronize to fast clock circuitry 465*b* may produce a synchronized clock gating signal SGATE. SGATE is synchronized to transition based on a transition (e.g., rising edge, falling edge) of aligned slow clock signal ALSCK that is further timed by DFCK (e.g., falling edge of DFCK) such that SGATE will transition with sufficient setup and hold time in advance of an edge of DFCK (e.g., rising edge) to avoid glitches and/or shortened clock phases on the output of fast clock gating circuitry 420. Synchronized clock gating signal SGATE is provided to fast clock gating circuitry 420.

In some embodiments, fast clock gating circuitry 420, in response to synchronized clock gating signal SGATE, may either passes DFCK or holds a constant output (e.g., logical "0"). The output of fast clock gating circuitry 420 is a gated (i.e., either enabled or disabled) version GFCK of DFCK. In an embodiment, where the FCK frequency is an integer multiple of the slow clock frequency, and the integer multiple is equal to the deserialization factor of deserializer circuitry 485 multiplied by the depth of FIFO buffer circuitry 481, because fast clock gating circuitry 420 is responsive to synchronized clock gating signal SGATE, and SGATE is synchronized to aligned slow clock ALSCK, SGATE will only transition such that the timing and value relationships between write pointer circuitry 482, read pointer circuitry 483, clock divider circuitry 484, and deserializer circuitry 485 are maintained across periods where DFCK is prevented (gated) from being provided to deserialization circuitry 480. By maintaining these relationships/values, until and as DFCK is ungated, the data path latency of SIN is the same as it was before DFCK was gated and therefore retraining of the SIN interface is not required.

FIG. 5 is a flowchart illustrating a method of operating a serializing integrated circuit. One or more of the steps illustrated in FIG. 5 may be performed by, for example, integrated circuit 100, integrated circuit 200, integrated circuit 400, and/or their components. A fast clock signal having a fast clock frequency, and a slow clock signal having a slow clock frequency, are generated (502). For example, PLL 251 may generate fast clock FCK having a fast clock frequency and slow clock SCK having a slow clock frequency.

In some embodiments, a write pointer that determines respective entries of a FIFO buffer that receive each parallel data word written to the FIFO buffer may be maintained where the FIFO buffer has a first number of entries (504). For example, serialization circuitry 270 may maintain write pointer circuitry 273 to determine the entry, out of the entries (e.g., 4) in FIFO buffer circuitry 271, that receives each respective parallel data word PDATA[ ] that is written to. A read pointer that determines respective entries of a FIFO buffer that provide each parallel data word read from the FIFO buffer, where changes to the read pointer are based on a divided fast clock signal and the divided fast clock signal has a divided fast clock frequency (506). For example, serialization circuitry 270 may maintain read pointer circuitry 272 where changes to the entry pointed to by read pointer circuitry 272 are based on the output of clock divider circuitry 274 and where the output of clock divider circuitry 274 has a frequency that has been divided down from the FCK frequency. For example, the frequency output of clock divider circuitry 274 may be the frequency of fast clock FCK divided by an integer.

In some embodiments, by serialization circuitry, data words read from the FIFO buffer may be received, where the serialization circuitry serialized the data words read from the FIFO buffer by a serialization factor and the serialization circuitry outputs serialized data words based on the fast clock signal and the divided fast clock frequency is the fast clock frequency divided by the serialization factor and the slow clock frequency is the divided fast clock frequency further divided by the first number of entries (508). For example, serializer circuitry 275 may receive, from FIFO buffer circuitry 271, parallel data words read from FIFO buffer circuitry 271 and output serialized version of these data words that have been serialized by a serialization factor (e.g., 16) based on the fast clock FCK, where the output of clock divider circuitry 274 is at the fast clock FCK frequency divided by the serialization factor and the slow clock SCK frequency is the divided clock frequency further divided by the number of entries in FIFO buffer circuitry 271.

In some embodiments, based on an asynchronous gating control signal, gating the provision of the fast clock signal to the maintaining of the read pointer to intervals that are integer multiples of the slow clock cycle time thereby maintaining timing relationships between the write pointer, read pointer, and divided fast clock (510). For example, based on asynchronous gating control signal ACKEN, synchronize to slow clock circuitry 265*a* and synchronize to fast clock circuitry 265*b* function to cause the gating of DFCK through fast clock gating circuitry 220 to occur over intervals that are multiples of the slow clock DSCK cycle time thereby maintaining the timing relationship between read pointer circuitry 272, write pointer, 273, and clock divider circuitry 274.

Figure 6:
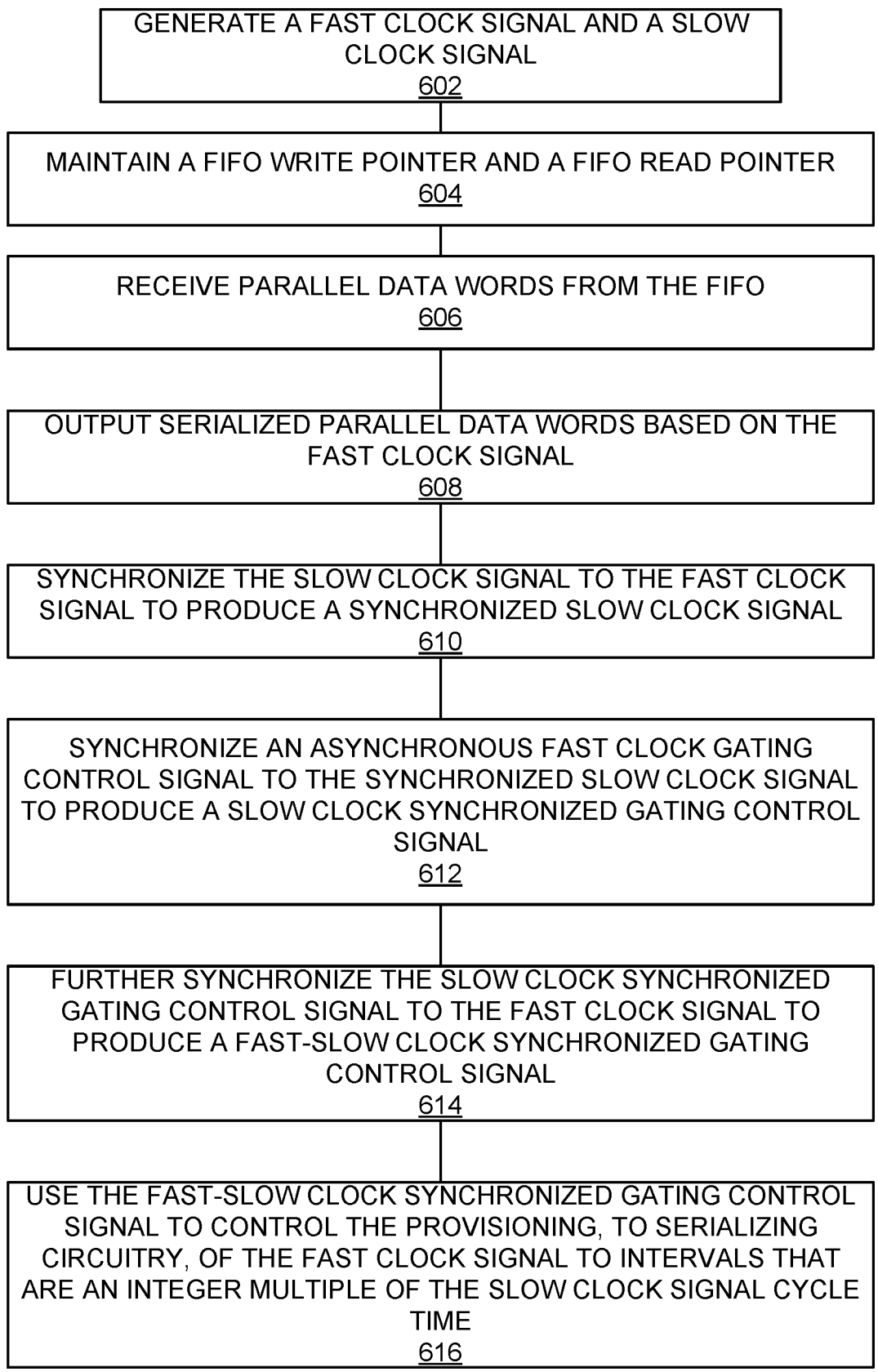
FIG. 6 is a flowchart illustrating a method of gating a clock signal provided to serializing circuitry.

FIG. 6 is a flowchart illustrating a method of gating a clock signal provided to serializing circuitry. One or more of the steps illustrated in FIG. 6 may be performed by, for example, integrated circuit 100, integrated circuit 200, integrated circuit 400, and/or their components. A fast clock signal and a slow clock signal are generated (602). For example, PLL 251 may generate fast clock FCK having a fast clock frequency and slow clock SCK having a slow clock frequency, where the fast clock frequency in an integer multiple of the slow clock frequency.

In some embodiments, a FIFO write pointer and a FIFO read pointer may be maintained (604). For example, serialization circuitry 270 may maintain write pointer circuitry 273 to determine the entry, out of the entries (e.g., 4) in FIFO buffer circuitry 271, that receives each respective parallel data word PDATA[ ] that is written to and also maintain read pointer circuitry 272 where changes to the entry pointed to by read pointer circuitry 272 are based on the output of clock divider circuitry 274. Parallel data words are received from the FIFO (606). For example, serializer circuitry 275 may receive from FIFO buffer circuitry 271, parallel data words read from FIFO buffer circuitry 271 according to the read pointer circuitry 272. Serialized data words are output based on the fast clock signal (608). For example, serializer circuitry 275 may output serialized version of received data words that it has serialized by a serialization factor (e.g., 16).

In some embodiments, the slow clock signal may be synchronized to the fast clock signal to produce a synchronized slow clock signal (610). For example, Delay circuitry 261, phase detector circuitry 262, and feedback control circuitry may form a delay locked loop that aligns aligned slow clock signal ALSCK with an edge of distributed fast clock signal DFCK. An asynchronous fast clock gating control signal is synchronized to the synchronized slow clock signal to produce a slow clock synchronized gating control signal (612). For example, synchronize to slow clock circuitry 265*a* may synchronize asynchronous clock enable signal ACKEN to aligned slow clock signal ALSCK to produce ALCKEN. The slow clock synchronized gating control signal is further synchronized to the fast clock signal to produce a fast-slow clock synchronized gating control signal (614). For example, synchronize to fast clock circuitry 265*b* may further synchronize ACKEN to an edge of DFCK thereby ensuring adequate setup and hold times for ALCKEN and/or SGATE.

In some embodiments, the fast-slow clock synchronized gating control signal may be used to control the provision, to serializing circuitry, of the fast clock signal to intervals that are an integer multiple of the slow clock signal cycle time (616). For example, the output of fast clock gating circuitry 220 may be controlled by SGATE, to occur over intervals that are multiples of the slow clock DFSK cycle time thereby maintaining the timing relationship between read pointer circuitry 272, write pointer, 273, and clock divider circuitry 274.

FIG. 7 is a flowchart illustrating a method of gating a clock signal provided to deserializing circuitry. One or more of the steps illustrated in FIG. 7 may be performed by, for example, integrated circuit 100, integrated circuit 400, integrated circuit 400, and/or their components. A fast clock signal having a fast clock frequency, and a slow clock signal having a slow clock frequency, are generated (702). For example, PLL 451 may generate fast clock FCK having a fast clock frequency and slow clock SCK having a slow clock frequency.

In some embodiments, a read pointer that determines respective entries of a FIFO buffer that produce deserialized parallel data words read from the FIFO buffer may be maintained where the FIFO buffer has a first number of entries (704). For example, deserialization circuitry 480 may maintain read pointer circuitry 483 to determine the entry, out of the entries (e.g., 4) in FIFO buffer circuitry 481, that produces each respective parallel data word PDATA[ ] from FIFO buffer circuitry 481. A write pointer that determines respective entries of the FIFO buffer that receive each deserialized parallel data word written to the FIFO buffer, where changes to the write pointer are based on a divided fast clock signal and the divided fast clock signal has a divided fast clock frequency (706). For example, deserialization circuitry 480 may maintain write pointer circuitry 482 where changes to the entry pointed to by write pointer circuitry 482 are based on the output of clock divider circuitry 484 and where the output of clock divider circuitry 484 has a frequency that has been divided down from the FCK frequency. For example, the frequency output of clock divider circuitry 484 may be the frequency of fast clock FCK divided by an integer.

In some embodiments, by deserialization circuitry, serialized parallel data words may be received, where the deserialization circuitry deserialized the received serial data words written to the FIFO buffer by a deserialization factor and the deserialization circuitry deserializing data words based on the fast clock signal and the divided fast clock frequency is the fast clock frequency divided by the deserialization factor and the slow clock frequency is the divided fast clock frequency further divided by the first number of entries (708). For example, deserializer circuitry 485 may receive, via SIN, serialized data words and output deserialized (i.e., parallel) versions of these data words that have been deserialized by a serialization factor (e.g., 16) based on the fast clock FCK, where the output of clock divider circuitry 484 is at the fast clock FCK frequency divided by the serialization factor and the slow clock SCK frequency is the divided clock frequency further divided by the number of entries in FIFO buffer circuitry 481.

In some embodiments, based on an asynchronous gating control signal, gating the provision of the fast clock signal to the maintaining of the write pointer to intervals that are integer multiples of the slow clock cycle time thereby maintaining timing relationships between the write pointer, read pointer, and divided fast clock (710). For example, based on asynchronous gating control signal ACKEN, synchronize to slow clock circuitry 465*a* and synchronize to fast clock circuitry 465*b* function to cause the gating of DFCK through fast clock gating circuitry 420 to occur over intervals that are multiples of the slow clock DSCK cycle time thereby maintaining the timing relationship between write pointer circuitry 482, read pointer, 483, and clock divider circuitry 484.

Figure 8:
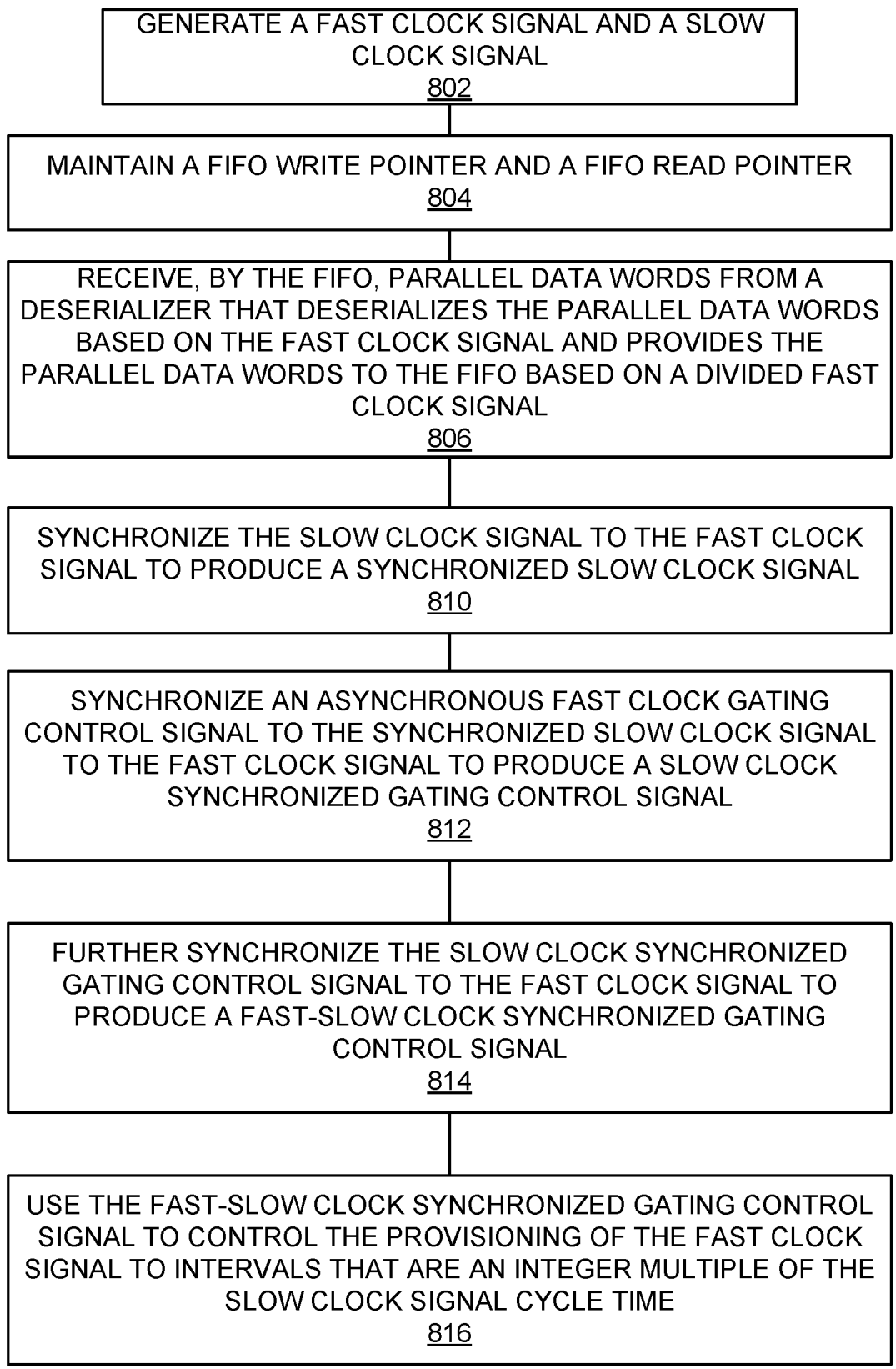
FIG. 8 is a flowchart illustrating a method of synchronizing an asynchronous gating signal to gate a clock signal provided to deserializing circuitry.

FIG. 8 is a flowchart illustrating a method of synchronizing an asynchronous gating signal to gate a clock signal provided to deserializing circuitry. One or more of the steps illustrated in FIG. 8 may be performed by, for example, integrated circuit 100, integrated circuit 400, integrated circuit 400, and/or their components. A fast clock signal and a slow clock signal are generated (802). For example, PLL 451 may generate fast clock FCK having a fast clock frequency and slow clock SCK having a slow clock frequency, where the fast clock frequency in an integer multiple of the slow clock frequency.

In some embodiments, a FIFO write pointer and a FIFO read pointer may be maintained (804). For example, deserialization circuitry 480 may read pointer circuitry 483 to determine the entry, out of the entries (e.g., 4) in FIFO buffer circuitry 481, that produces each respective parallel data word PDATA[ ] that is output from deserialization circuitry 480 and also maintain write pointer circuitry 482 to determine the entry that receives the current parallel data word deserialized by deserializer circuitry 485, where changes to the entry pointed to by write pointer circuitry 482 are based on the output of clock divider circuitry 484. Parallel data words are received by the FIFO from a deserializer that deserializes based on the fast clock signal and provides the parallel data words based on a divided clock signal (806). For example, deserializer circuitry 485 may provide, to FIFO buffer circuitry 481, parallel data words deserialized from SIN that were deserialized using DFCK and that are written to FIFO buffer circuitry 481 according to the write pointer circuitry 482.

In some embodiments, the slow clock signal may be synchronized to the fast clock signal to produce a synchronized slow clock signal (810). For example, Delay circuitry 461, phase detector circuitry 462, and feedback control circuitry may form a delay locked loop that aligns aligned slow clock signal ALSCK with an edge of distributed fast clock signal DFCK. An asynchronous fast clock gating control signal is synchronized to the synchronized slow clock signal to produce a slow clock synchronized gating control signal (812). For example, synchronize to slow clock circuitry 465*a* may synchronize asynchronous clock enable signal ACKEN to aligned slow clock signal ALSCK to produce ALCKEN. The slow clock synchronized gating control signal is further synchronized to the fast clock signal to produce a fast-slow clock synchronized gating control signal (814). For example, synchronize to fast clock circuitry 465*b* may further synchronize ACKEN to an edge of DFCK thereby ensuring adequate setup and hold times for ALCKEN and/or SGATE.

In some embodiments, the fast-slow clock synchronized gating control signal may be used to control the provision, to deserializing circuitry, of the fast clock signal to intervals that are an integer multiple of the slow clock signal cycle time (816). For example, the output of fast clock gating circuitry 420 may be controlled by SGATE, to occur over intervals that are multiples of the slow clock DSCK cycle time thereby maintaining the timing relationship between write pointer circuitry 482, read pointer, 483, and clock divider circuitry 484.

The methods, systems and devices described above may be implemented in computer systems or stored by computer systems. The methods described above may also be stored on a non-transitory computer readable medium. Devices, circuits, and systems described herein may be implemented using computer-aided design tools available in the art and embodied by computer-readable files containing software descriptions of such circuits. This includes, but is not limited to, one or more elements of integrated circuit 100, integrated circuit 400, integrated circuit 400, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to, formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 9:
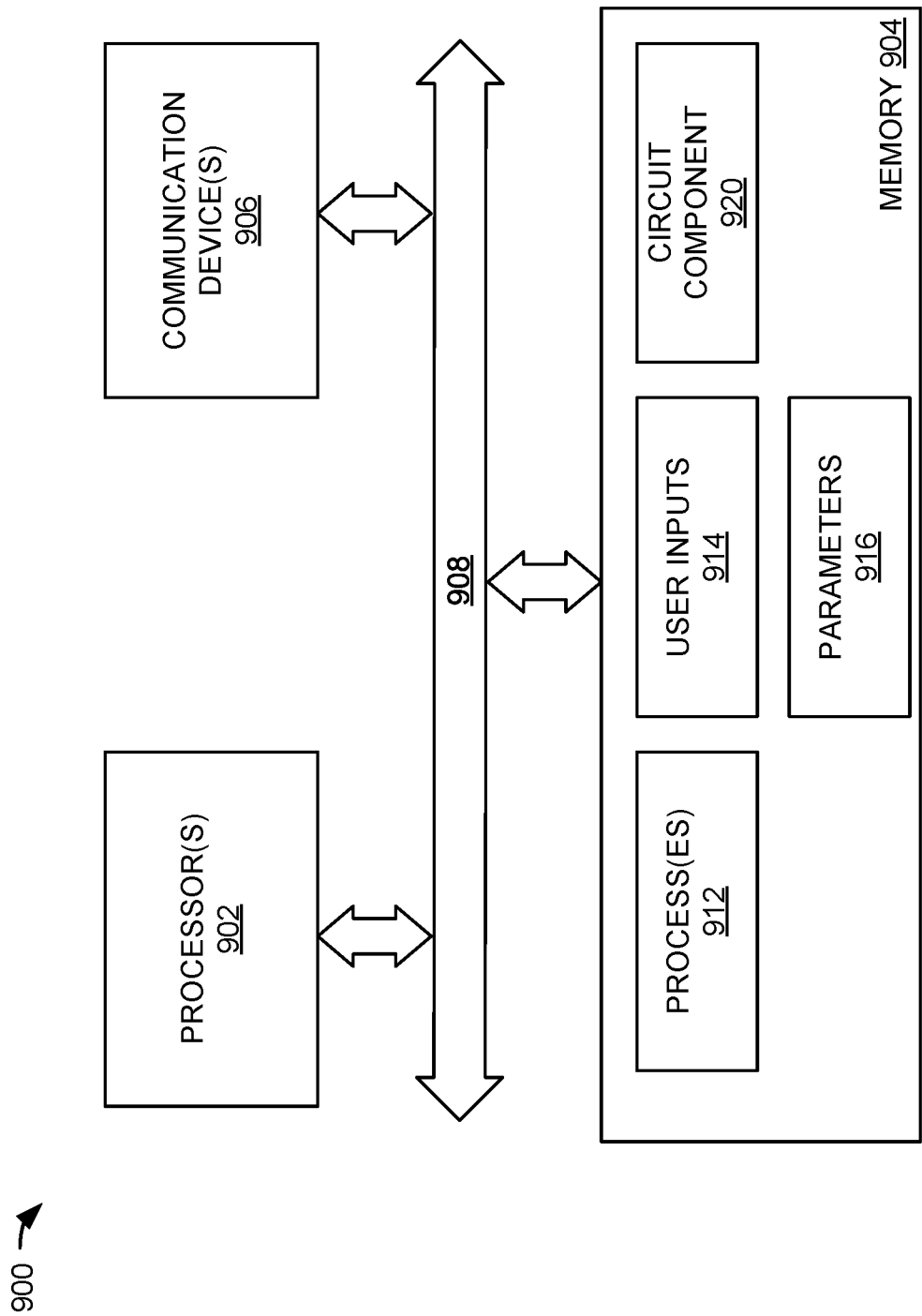
FIG. 9 is a block diagram of a processing system.

FIG. 9 is a block diagram illustrating one embodiment of a processing system 900 for including, processing, or generating, a representation of a circuit component 920. Processing system 900 includes one or more processors 902, a memory 904, and one or more communications devices 906. Processors 902, memory 904, and communications devices 906 communicate using any suitable type, number, and/or configuration of wired and/or wireless connections 908.

Processors 902 execute instructions of one or more processes 912 stored in a memory 904 to process and/or generate circuit component 920 responsive to user inputs 914 and parameters 916. Processes 912 may be any suitable electronic design automation (EDA) tool or portion thereof used to design, simulate, analyze, and/or verify electronic circuitry and/or generate photomasks for electronic circuitry. Representation 920 includes data that describes all or portions of integrated circuit 100, integrated circuit 400, integrated circuit 400, and their components, as shown in the Figures.

Representation 920 may include one or more of behavioral, register transfer, logic component, transistor, and layout geometry-level descriptions. Moreover, representation 920 may be stored on storage media or communicated by carrier waves.

Data formats in which representation 920 may be implemented include, but are not limited to, formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email.

User inputs 914 may comprise input parameters from a keyboard, mouse, voice recognition interface, microphone and speakers, graphical display, touch screen, or other type of user interface device. This user interface may be distributed among multiple interface devices. Parameters 916 may include specifications and/or characteristics that are input to help define representation 920. For example, parameters 916 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 904 includes any suitable type, number, and/or configuration of non-transitory computer-readable storage media that stores processes 912, user inputs 914, parameters 916, and circuit component 920.

Communications devices 906 include any suitable type, number, and/or configuration of wired and/or wireless devices that transmit information from processing system 900 to another processing or storage system (not shown) and/or receive information from another processing or storage system (not shown). For example, communications devices 906 may transmit circuit component 920 to another system. Communications devices 906 may receive processes 912, user inputs 914, parameters 916, and/or circuit component 920 and cause processes 912, user inputs 914, parameters 916, and/or circuit component 920 to be stored in memory 904.

Implementations discussed herein include, but are not limited to, the following examples:

Example 1: An integrated circuit, comprising: clock gating circuitry to, based on a synchronized control signal, enable a first clock signal having a first frequency to be provided to serialization circuitry; a delay-locked loop element to receive the first clock signal and a second clock signal having a second frequency, the delay-locked loop element to generate a delayed version of the second clock signal with a first edge of the delayed version of the second clock signal that is substantially time-aligned with a first edge of the first clock signal, the first frequency to be a first integer multiple of the second frequency; and gating control synchronization circuitry to, based on an asynchronous clock gating signal, the delayed version of the second clock signal, and the first clock signal, generate the synchronized control signal.

Example 2: The integrated circuit of example 1, wherein the first edge of the first clock signal and the first edge of the delayed version of the second clock signal are both rising edges.

Example 3: The integrated circuit of example 1, wherein the first integer multiple is equivalent to a serialization factor of the serialization circuitry multiplied by a first-in first-out depth of the serialization circuitry.

Example 4: The integrated circuit of example 1, wherein the asynchronous clock gating signal is asynchronous relative to the second clock signal.

Example 5: The integrated circuit of example 4, wherein the gating control synchronization circuitry further comprises: first synchronization circuitry to synchronize the asynchronous clock gating signal to the second clock signal to generate a first synchronized clock gating signal.

Example 6: The integrated circuit of example 5, wherein the gating control synchronization circuitry further comprises: second synchronization circuitry to synchronize the first synchronized clock gating signal to the first clock signal to generate the synchronized control signal.

Example 7: The integrated circuit of example 6, wherein the first synchronized clock gating signal is provided to the second synchronization circuitry between a second edge of the first clock signal and the first edge of the first clock signal.

Example 8: An integrated circuit, comprising: parallel data signals to serial data signals serialization circuitry comprising a first-in first-out buffer (FIFO) with a first depth of parallel data entries to receive parallel data to be serialized, and serialization circuitry to receive the parallel data via the FIFO and output serialized data, based on the parallel data, that has been serialized by a first serialization factor, the serialization circuitry to output the serialized data timed by a fast clock signal, the serialization circuitry to receive the parallel data timed by a first divided fast clock signal, the first divided fast clock signal to have a first frequency that is a second frequency of the fast clock signal divided by the serialization factor; clock generation circuitry to generate the fast clock signal and a slow clock signal, the slow clock signal to have a third frequency that is the first frequency divided by the first depth; clock gating circuitry to, based on a synchronized control signal, enable a first clock signal having a first frequency to be provided to serialization circuitry; a delay-locked loop element to receive the fast clock signal and the slow clock signal, the delay-locked loop element to generate a delayed slow clock signal that is substantially time-aligned with an edge of the fast clock signal; gating control synchronization circuitry to, based on an asynchronous clock gating signal, the delayed slow clock signal, and the fast clock signal, generate a synchronized gating control signal; and fast clock gating circuitry to, based on the synchronized gating control signal, selectively provide the fast clock signal to the parallel data signals to serial data signals serialization circuitry.

Example 9: The integrated circuit of example 8, wherein the fast clock signal and the slow clock signal are generated by phase-locked loop circuitry.

Example 10: The integrated circuit of example 8, wherein the parallel data signals to serial data signals serialization circuitry further comprises: write pointer circuitry that determines a first current FIFO entry receiving parallel data.

Example 11: The integrated circuit of example 10, wherein the parallel data signals to serial data signals serialization circuitry further comprises: read pointer circuitry that determines, based on the first divided fast clock signal, a second current FIFO entry providing parallel data to the serialization circuitry.

Example 12: The integrated circuit of example 11, wherein the gating control synchronization circuitry generates the synchronized gating control signal to maintain a timing relationship between the write pointer circuitry and the read pointer circuitry.

Example 13: The integrated circuit of example 12, wherein the asynchronous clock gating signal is asynchronous relative to the slow clock signal.

Example 14: The integrated circuit of example 13, wherein the gating control synchronization circuitry further comprises: first synchronization circuitry to synchronize the asynchronous clock gating signal to the slow clock signal to generate a first slow clock synchronized gating signal.

Example 15: The integrated circuit of example 14, wherein the gating control synchronization circuitry further comprises: second synchronization circuitry to synchronize the first slow clock synchronized gating signal to the first clock signal to generate the synchronized gating control signal.

Example 16: A method of operating an integrated circuit, comprising: generating a fast clock signal having a fast clock frequency and a slow clock signal having a slow clock frequency; maintaining a write pointer that determines respective entries of a FIFO buffer that receive each parallel data word written to the FIFO buffer, the FIFO buffer having a first number of entries; maintaining a read pointer that determines respective entries of the FIFO buffer that provide each parallel data word read from the FIFO buffer, changes to the read pointer being based on a divided fast clock signal, the divided fast clock signal to have a divided fast clock frequency; receiving, by serialization circuitry, data words read from the FIFO buffer, the serialization circuitry serializing the data words read from the FIFO buffer by a serialization factor, the serialization circuitry outputting serialized data words based on the fast clock signal, the divided fast clock frequency to be the fast clock frequency divided by the serialization factor, the slow clock frequency to be the divided fast clock frequency divided by the first number of entries; and based on an asynchronous gating control signal, gating a provisioning of the fast clock signal to the maintaining of the read pointer to intervals that are integer multiples of a slow clock cycle time thereby maintaining timing relationships between the write pointer, read pointer, and divided fast clock.

Example 17: The method of example 16, further comprising: synchronizing the slow clock signal to the fast clock signal to produce a synchronized slow clock signal.

Example 18: The method of example 17, further comprising: synchronizing the asynchronous gating control signal to the synchronized slow clock signal to produce a slow clock synchronized gating control signal.

Example 19: The method of example 18, further comprising: further synchronizing a slow clock synchronized gating control signal to the fast clock signal to produce a fast and slow clock synchronized gating control signal.

Example 20: The method of example 19, further comprising: using the fast and slow clock synchronized gating control signal to control the provisioning of the fast clock signal to the maintaining of the read pointer to intervals that are an integer multiple of the slow clock cycle time.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An integrated circuit, comprising:
   clock gating circuitry to, based on a synchronized control signal, enable a first clock signal having a first frequency to be provided to serialization circuitry;
   a delay-locked loop element to receive the first clock signal and a second clock signal having a second frequency, the delay-locked loop element to generate a delayed version of the second clock signal with a first edge of the delayed version of the second clock signal that is substantially time-aligned with a first edge of the first clock signal, the first frequency to be a first integer multiple of the second frequency; and
   gating control synchronization circuitry to, based on an asynchronous clock gating signal, the delayed version of the second clock signal, and the first clock signal, generate the synchronized control signal.

2. The integrated circuit of claim 1, wherein the first edge of the first clock signal and the first edge of the delayed version of the second clock signal are both rising edges.

3. The integrated circuit of claim 1, wherein the first integer multiple is equivalent to a serialization factor of the serialization circuitry multiplied by a first-in first-out depth of the serialization circuitry.

4. The integrated circuit of claim 1, wherein the asynchronous clock gating signal is asynchronous relative to the second clock signal.

5. The integrated circuit of claim 4, wherein the gating control synchronization circuitry further comprises:
   first synchronization circuitry to synchronize the asynchronous clock gating signal to the second clock signal to generate a first synchronized clock gating signal.

6. The integrated circuit of claim 5, wherein the gating control synchronization circuitry further comprises:
   second synchronization circuitry to synchronize the first synchronized clock gating signal to the first clock signal to generate the synchronized control signal.

7. The integrated circuit of claim 6, wherein the first synchronized clock gating signal is provided to the second synchronization circuitry between a second edge of the first clock signal and the first edge of the first clock signal.

8. An integrated circuit, comprising:
   parallel data signals to serial data signals serialization circuitry comprising a first-in first-out buffer (FIFO) with a first depth of parallel data entries to receive parallel data to be serialized, and serialization circuitry to receive the parallel data via the FIFO and output serialized data, based on the parallel data, that has been serialized by a first serialization factor, the serialization circuitry to output the serialized data timed by a fast clock signal, the serialization circuitry to receive the parallel data timed by a first divided fast clock signal, the first divided fast clock signal to have a first frequency that is a second frequency of the fast clock signal divided by the serialization factor;

clock generation circuitry to generate the fast clock signal and a slow clock signal, the slow clock signal to have a third frequency that is the first frequency divided by the first depth;

clock gating circuitry to, based on a synchronized control signal, enable a first clock signal having a first frequency to be provided to serialization circuitry;

a delay-locked loop element to receive the fast clock signal and the slow clock signal, the delay-locked loop element to generate a delayed slow clock signal that is substantially time-aligned with an edge of the fast clock signal;

gating control synchronization circuitry to, based on an asynchronous clock gating signal, the delayed slow clock signal, and the fast clock signal, generate a synchronized gating control signal; and fast clock gating circuitry to, based on the synchronized gating control signal, selectively provide the fast clock signal to the parallel data signals to serial data signals serialization circuitry.

9. The integrated circuit of claim 8, wherein the fast clock signal and the slow clock signal are generated by phase-locked loop circuitry.

10. The integrated circuit of claim 8, wherein the parallel data signals to serial data signals serialization circuitry further comprises:
write pointer circuitry that determines a first current FIFO entry receiving parallel data.

11. The integrated circuit of claim 10, wherein the parallel data signals to serial data signals serialization circuitry further comprises:
read pointer circuitry that determines, based on the first divided fast clock signal, a second current FIFO entry providing parallel data to the serialization circuitry.

12. The integrated circuit of claim 11, wherein the gating control synchronization circuitry generates the synchronized gating control signal to maintain a timing relationship between the write pointer circuitry and the read pointer circuitry.

13. The integrated circuit of claim 12, wherein the asynchronous clock gating signal is asynchronous relative to the slow clock signal.

14. The integrated circuit of claim 13, wherein the gating control synchronization circuitry further comprises:
first synchronization circuitry to synchronize the asynchronous clock gating signal to the slow clock signal to generate a first slow clock synchronized gating signal.

15. The integrated circuit of claim 14, wherein the gating control synchronization circuitry further comprises:
second synchronization circuitry to synchronize the first slow clock synchronized gating signal to the first clock signal to generate the synchronized gating control signal.

16. A method of operating an integrated circuit, comprising:
generating a fast clock signal having a fast clock frequency and a slow clock signal having a slow clock frequency;

maintaining a write pointer that determines respective entries of a FIFO buffer that receive each parallel data word written to the FIFO buffer, the FIFO buffer having a first number of entries;

maintaining a read pointer that determines respective entries of the FIFO buffer that provide each parallel data word read from the FIFO buffer, changes to the read pointer being based on a divided fast clock signal, the divided fast clock signal to have a divided fast clock frequency;

receiving, by serialization circuitry, data words read from the FIFO buffer, the serialization circuitry serializing the data words read from the FIFO buffer by a serialization factor, the serialization circuitry outputting serialized data words based on the fast clock signal, the divided fast clock frequency to be the fast clock frequency divided by the serialization factor, the slow clock frequency to be the divided fast clock frequency divided by the first number of entries; and based on an asynchronous gating control signal, gating a provisioning of the fast clock signal to the maintaining of the read pointer to intervals that are integer multiples of a slow clock cycle time thereby maintaining timing relationships between the write pointer, read pointer, and divided fast clock.

17. The method of claim 16, further comprising:
synchronizing the slow clock signal to the fast clock signal to produce a synchronized slow clock signal.

18. The method of claim 17, further comprising:
synchronizing the asynchronous gating control signal to the synchronized slow clock signal to produce a slow clock synchronized gating control signal.

19. The method of claim 18, further comprising:
further synchronizing a slow clock synchronized gating control signal to the fast clock signal to produce a fast and slow clock synchronized gating control signal.

20. The method of claim 19, further comprising:
using the fast and slow clock synchronized gating control signal to control the provisioning of the fast clock signal to the maintaining of the read pointer to intervals that are an integer multiple of the slow clock cycle time.

* * * * *